(12) United States Patent  
Chikaraishi

(10) Patent No.: US 6,301,975 B1  
(45) Date of Patent: Oct. 16, 2001

(54) TORQUE SENSOR HAVING IMPROVED RELIABILITY AGAINST THERMAL EXPANSION AND AXIAL DISPLACEMENT OF COMPONENTS

(75) Inventor: Kazuo Chikaraishi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/256,099

(22) Filed: Feb. 24, 1999

(30) Foreign Application Priority Data

Feb. 26, 1998 (JP) .................................................. 10-060404
Feb. 26, 1998 (JP) .................................................. 10-060406

(51) Int. Cl.$^7$ ....................................................... G01L 3/10
(52) U.S. Cl. .................. 73/862.331; 73/862.11; 73/862.334; 73/862.08; 73/862
(58) Field of Search ........................ 73/862.331, 862.33, 73/862.332, 862.333, 862.334

(56) References Cited

U.S. PATENT DOCUMENTS

| 4,881,414 | * | 11/1989 | Setaka et al. | ................... | 73/862.333 |
| 5,796,014 | * | 8/1998 | Chikaraishi et al. | ............ | 73/862.331 |
| 5,811,695 | * | 9/1998 | Satoh et al. | ...................... | 73/862.331 |

FOREIGN PATENT DOCUMENTS 6-17060  *  5/1994  (JP) ................................. G01L/3/10

* cited by examiner

Primary Examiner—Benjamin R. Fuller  
Assistant Examiner—Andre Allen  
(74) Attorney, Agent, or Firm—Sughrue, Mion, Zinn, Macpeak & Seas, PLLC

(57) ABSTRACT

A torque sensor having a plurality of axial grooves formed on an outer circumferential surface of the end portion of a first rotation shaft to which a cylindrical member is fixed so as to be extended in an axial direction of the first rotation shaft. A circumferential groove is continuously and circumferentially formed on the outer circumferential surface of the end portion of the first rotation shaft. A plurality of protrusions are formed on an inner circumferential surface of the cylindrical member to be fitted into the plurality of axial grooves respectively to thereby prevent a rotation of the cylindrical member relative to the first rotation shaft. A portion of the cylindrical member which is disposed outward of the circumferential groove is deformed to fit into the circumferential groove to thereby prevent an axial displacement of the cylindrical member relative to the first rotation shaft. Further, a coil unit having a coil is disposed so as to enclose a second rotation shaft. The coil unit comprises a coil bobbin having the coil wound thereon, and a coil yoke for receiving the coil bobbin. The coil bobbin is received therein between opposite bottom surfaces having a U-shape section. Further, at least one of the coil bobbin and the coil yoke axially press the other one of the coil bobbin and the coil yoke when the coil bobbin is received in the coil yoke.

10 Claims, 9 Drawing Sheets

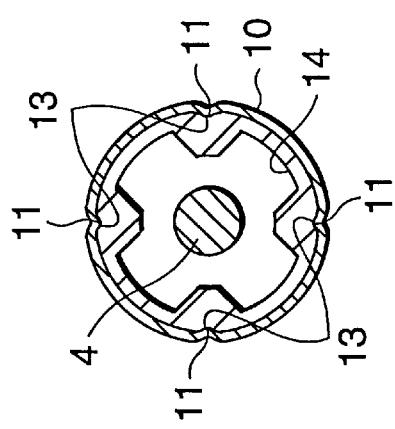
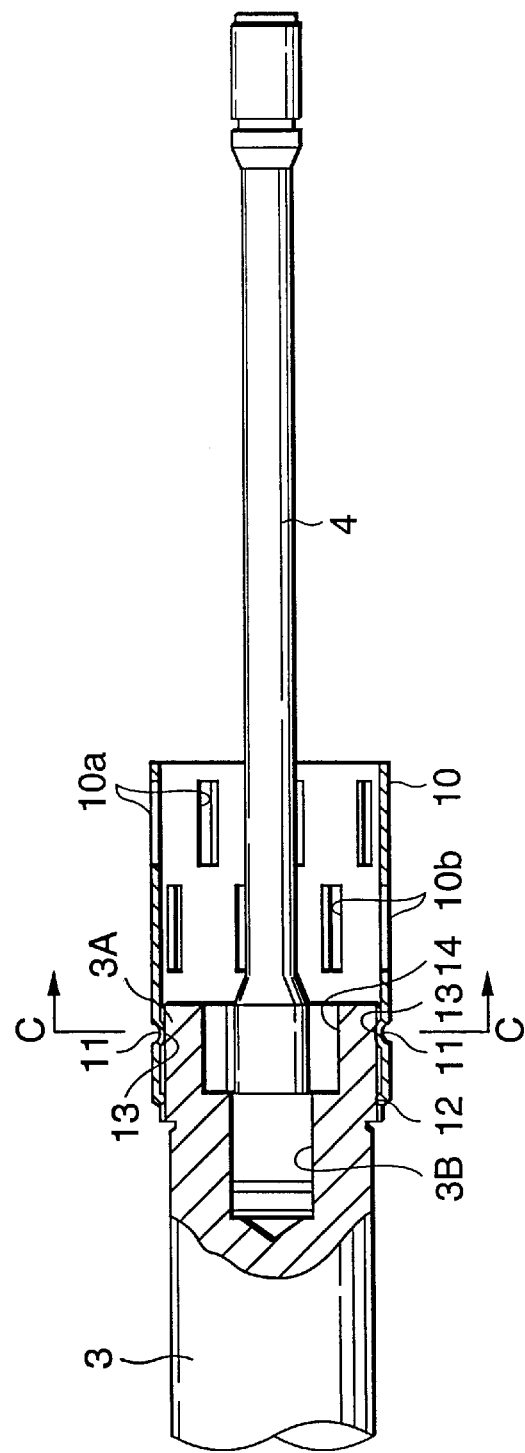
FIG.5A
FIG.5B

FIG.8A
FIG.8B
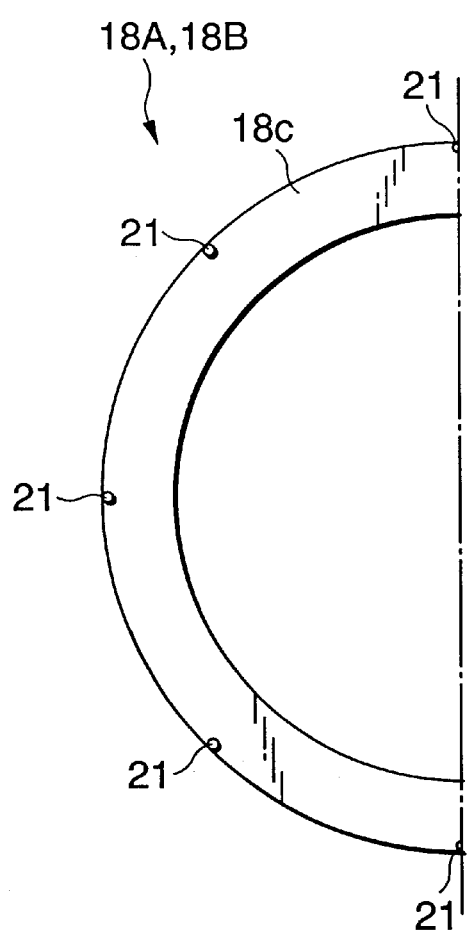
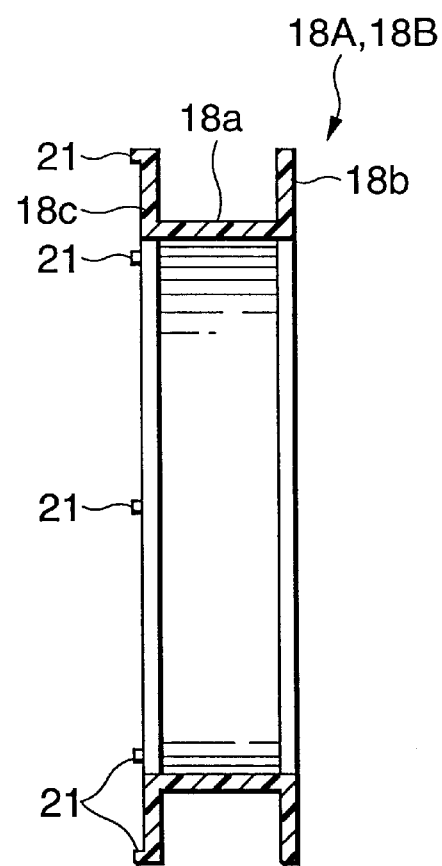

TORQUE SENSOR HAVING IMPROVED RELIABILITY AGAINST THERMAL EXPANSION AND AXIAL DISPLACEMENT OF COMPONENTS

BACKGROUND OF THE INVENTION

1. Field of the Invention

The present invention relates to a torque sensor for detecting torque generated in a rotation shaft, and particularly it is directed to attain the torque sensor in which not only labor at the time of assembling can be simplified but also reliability can be improved.

The present application is based on Japanese Patent Applications Nos. Hei. 10-60404 and 10-60406, which are incorporated herein by reference.

2. Description of the Related Art

As related art of this type, for example, there is such a technique as disclosed in Japanese Patent Publication No. Hei. 8-240491. In this torque sensor, first and second rotation shafts disposed coaxially are connected to each other through a torsion bar. Further, a cylindrical member made of an electrically conductive non-magnetic material is integrated with the second rotation shaft in the direction of the rotation thereof so as to enclose an outer circumferential surface of the first rotation shaft. At least a portion of the first rotation shaft which is enclosed by the cylindrical member is made of a magnetic material. Grooves extending axially are formed in the enclosed portion. Windows are formed in the cylindrical member so that the state of overlapping of the windows with the grooves changes in accordance with the position of rotation of the cylindrical member relative to the first rotation shaft. Further, coils are disposed so as to enclose the portion of the cylindrical member in which the windows are formed. Torque is detected on the basis of inductance in the coils. Accordingly, there is obtained an effect that not only high-accurate torque detection is performed by a simple structure but also reduction in apparatus size is attained.

Certainly, such a related-art torque sensor as disclosed in Japanese Patent Publication No. Hei. 8-240491 can show the aforementioned effect. However, as a result of earnest researches made by the present inventors, it was found that the structure of fixture of the cylindrical member to the rotation shaft is important to keep the reliability of the torque sensor high.

That is, in the case of a torque sensor as disclosed in Japanese Patent Publication No. Hei. 8-240491, the cylindrical member is made of aluminum, or the like, whereas the rotation shaft for fixing the cylindrical member thereon is made of iron, or the like. Accordingly, the thermal expansion coefficients of the two are often different from each other. As a result, with such a simple structure in which the cylindrical member is press-fitted into the rotation shaft, the power for holding the cylindrical member to the rotation shaft may vary in accordance with the temperature so that the holding power cannot be kept. Further, when the holding power is reduced, both the rotational position and axial position of the cylindrical member relative to the rotation shaft are displaced so that detection accuracy is lowered.

As for other torque sensors, for example, there are those which are disclosed in Japanese Patent Publication Nos. Hei. 4-47638, 8-5477, and so on. In these torque sensors, torque acting on a rotation shaft is made to be reflected in the change of impedance of a coil so that the impedance change is detected to thereby detect torque. That is, the coil is disposed so as to enclose the rotation shaft, so that the impedance of the coil is changed on the basis of the change in magnetic or mechanical structure in accordance with torque of the rotation shaft. Accordingly, if a voltage between terminals of the coil is measured to thereby detect the impedance change, torque generated in the rotation shaft can be detected. Further, in the related-art torque sensors, in order to cancel the impedance change of the coil caused by factors such as temperature, etc. other than torque, two coils are disposed so that impedance changes caused by torque become reverse in direction to each other. A bridge circuit containing these two coils is formed so that torque is detected on the basis of the difference between two outputs of the bridge circuit. That is, even in the case where impedance changes of the coils are caused by factors other than torque, the impedance changes caused by such factors can be canceled with each other when the difference between the output voltages of the bridge circuit is obtained because the impedance changes due to such factors are generated in one and the same direction in the two coils.

Here, the aforementioned torque sensor has a coil bobbin on which each coil is wound. Pins for connecting coil end portions to a substrate are fixed to the coil bobbin. That is, the coil bobbin is generally made of plastics. For example, two metal pins corresponding to the coil are fixed to a terminal portion of the plastic coil bobbin. The end portions of the coil are wound on the bases of the pins. Top ends of the pins are inserted into the substrate so that electrical conduction is made between the substrate and the coil. Further, the coil bobbin is generally received in a coil yoke which is fixed to the housing to form a magnetic circuit.

In the aforementioned configuration, when a coil bobbin is put in a coil yoke, a gap may be produced between the coil bobbin and the coil yoke in accordance with the machining accuracy, or the like, of various parts. In some case, combination is made so that the coil bobbin may move axially relative to the coil yoke. Then, when the coil yoke is fixed to the housing, the positions of pins are not determined. This caused inconvenience when pins were inserted in predetermined positions of the substrate, and became hindrance against automatization, or the like. Further, even after the pins were fixed to the substrate by means of soldering, or the like, the coil bobbin moved axially, so that load was imposed on a joint portion between each pin and the substrate and the probability of occurrence of joint failure, or the like, was relatively high.

SUMMARY OF THE INVENTION

The present invention has been achieved paying attention to the above problems to be solved, and an object of the present invention is to provide a torque sensor in which not only labor at the time of assembling can be simplified but also improvement of reliability can be attained.

According to one aspect of the present invention, there is provided a torque sensor comprising a torsion bar, a first rotation shaft, a second rotation shaft disposed coaxially and connected to the first rotation shaft through the torsion bar. And a cylindrical member is fixed to an end portion of the first rotation shaft so as to enclose at least a part of the second rotation shaft to thereby detect torque based on an overlapping state of the cylindrical member with the second rotation shaft. A plurality of axial grooves are formed on an outer circumferential surface of the end portion of the first rotation shaft to which the cylindrical member is fixed so as to be extended in an axial direction of the first rotation shaft. Further, a circumferential groove continuously and circumferentially formed on the outer circumferential surface of the end portion of the first rotation shaft. Still further, a plurality of protrusions is formed on an inner circumferential surface of the cylindrical member to be fitted into the plurality of axial grooves respectively. The protrusions are fitted into the axial grooves respectively to thereby prevent a rotation of the cylindrical member relative to the first rotation shaft. A portion of the cylindrical member which is disposed outward of the circumferential groove is deformed to fit into the circumferential groove to thereby prevent an axial displacement of the cylindrical member relative to the first rotation shaft.

Incidentally, it is preferable to form the axial grooves as well as the stopper structure formed in the first rotation shaft. Here, the word "stopper" means a stopper for limiting the rotation angle of the first rotation shaft relative to the second rotation shaft within a predetermined angle range (about ±5 degrees). For example, the stopper is constituted by convex portions (male stopper) formed on the outer circumferential surface of an end portion of the second rotation shaft so as to be protruded radially and concave portions (female stopper) formed in an end surface of the first rotation shaft and slightly wider than the convex portions.

Further, if the axial grooves are produced together with the stopper structure (female stopper in the aforementioned example) by means of cold forging, the first and second rotation shafts are combined with each other in accordance with the neutral position of the stopper when respective members are assembled. Further, if the protrusions are fitted respectively into the axial grooves of the first rotation shaft to thereby perform circumferential positioning of the cylindrical member, the assembling phase of the cylindrical member relative to the first rotation shaft is guaranteed. On the contrary, in the configuration in which the cylindrical member is forced into the first rotation shaft, the assembling process is too complex to bring a cause of increase in cost because the cylindrical member must be forced into the first rotation shaft while phase adjustment is performed between the second rotation shaft and the cylindrical member, after the first and second rotation shafts are combined with each other.

According to another aspect of the invention, there is provided a torque sensor comprising a housing, a rotation shaft supported to the housing so as to be rotatable, a coil unit having a coil disposed so as to enclose the rotation shaft, and an impedance change means for changing impedance of the coil in accordance with change of torque acting on the rotation shaft, in which torque generated in the rotation shaft is detected based on a voltage between terminals of the coil. The coil unit comprises a coil bobbin having the coil wound thereon, and a coil yoke for receiving the coil bobbin. The coil yoke comprises a ring-like member having a U-shape section which is radially opened in an inner side so that the coil bobbin is received therein between opposite bottom surfaces of the U-shape in section. Further, pressure means is provided in at least one of the coil bobbin and the coil yoke for axially pressing the other one of the coil bobbin and the coil yoke when the coil bobbin is received in the coil yoke.

That is, when the pressure means provided in the coil bobbin presses the coil yoke axially or when the pressure means provided in the coil yoke presses the coil bobbin axially, the pressing force prevents the axial movement of the coil bobbin in the coil yoke.

Further, the coil bobbin may be constituted, for example, by a ring-like member U-shaped in section which is opened in the outer circumferential surface side. Further, the coil bobbin may be made, for example, of a synthetic resin which is reinforced by fiber such as glass fiber, carbon fiber, or the like, and has strength and elasticity to some degree.

When the coil bobbin of a synthetic resin having strength and elasticity to some degree is constituted by a ring-like member U-shaped in section opened in the outer circumferential surface side, it is preferable to form the pressure means by a plurality of protrusions formed in a plurality of circumferential positions on the circumferential edge portion of the end surface of the coil bobbin. The reason why the pressure means is provided in the coil bobbin is that generally the coil bobbin of synthetic resin can be finished easier than the coil yoke of iron.

Further, if the aforementioned protrusions are provided in the coil bobbin, the protrusions abut on the bottom surface of the coil yoke when the coil bobbin is received in the coil yoke. As a result, the end surface of the coil bobbin is bent inward. The bottom surface of the coil yoke is pressed axially by the restoring force of the bent coil bobbin, so that the axial movement of the coil bobbin is prevented. Furthermore, if the formation position of the protrusions is set in the circumferential edge portion of the end surface, the center portion where the coil is wound is little affected because the portion in the vicinity of the circumferential edge is mainly bent even in the case where the end surface of the coil bobbin is bent inward by the protrusions pressing the bottom surface of the coil yoke.

Further, if notches led to the outer circumference of the end surface are formed on the left and right sides of the aforementioned protrusions when the aforementioned protrusions are formed in the coil bobbin, the operation of the present invention can be fulfilled more remarkably because portions formed between the notches can be easily bent like leaf springs.

Features and advantages of the invention will be evident from the following detailed description of the preferred embodiments described in conjunction with the attached drawings.

BRIEF DESCRIPTION OF THE DRAWINGS

In the accompanying drawings:

FIGS. 5A and 5B are views showing the configuration of the end portion of the output shaft in the condition that the torsion bar is assembled with the output shaft;

FIGS. 8A and 8B are views showing another embodiment of the coil unit;

DETAILED DESCRIPTION OF THE PREFERRED EMBODIMENTS

An embodiment of the present invention will be described below with reference to the drawings.

Figure 1:
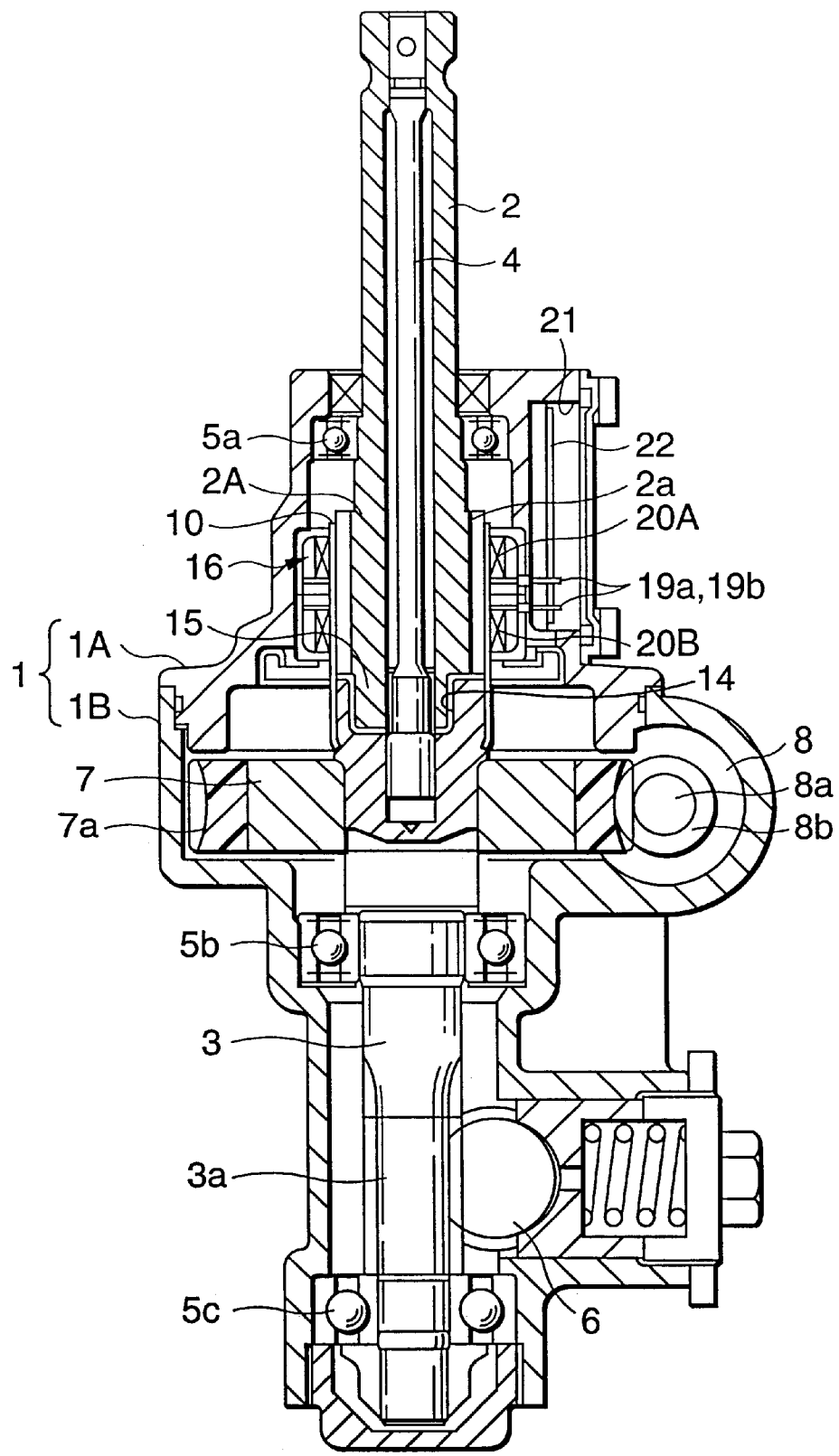
FIG. 1 is a vertical sectional view showing the overall configuration of an embodiment of the present invention.

FIGS. 1 to 7 are views showing an embodiment of the present invention. In this embodiment, a torque sensor according to the present invention is applied to an electric power steering apparatus of a vehicle. FIG. 1 is a vertical sectional view showing a main part of a steering system.

The configuration will be described first. In a housing 1 constituted by an upper housing 1A and a lower housing 1B, an input shaft 2 and an output shaft 3 connected to each other through a torsion bar 4 are rotatably supported by shaft bearings 5a, 5b and 5c. These input shaft 2, output shaft 3 and torsion bar 4 are disposed coaxially. The upper end side of the torsion bar 4 is pin-connected to the input shaft 2 in a position in which the torsion bar 4 goes deep into the input shaft 2, so that the torsion bar 4 is integrated with the input shaft 2 in the direction of the rotation thereof. Further, the lower end side of the torsion bar 4 is spline-connected to the output shaft 3, so that the torsion bar 4 is integrated with the output shaft 3 in the direction of the rotation thereof. The input shaft 2 and the output shaft 3 are made from a magnetic material such as iron, or the like.

Further, a steering wheel is integrally attached to the upper end portion of the input shaft 2, in the rotational direction, through a universal joint, a steering shaft, or the like, not shown. Further, a pinion shaft 3a is integrally formed in the lower end portion of the output shaft 3 so that the pinion shaft engages with a rack shaft 6. These pinion shaft 3a and rack shaft 6 constitute a known rack-and-pinion type steering apparatus. Accordingly, steering power produced when a driver steers the steering wheel is transmitted to a transmission wheel not shown, through the input shaft 2, the torsion bar 4, the output shaft 3 and the rack-and-pinion type steering apparatus.

Further, a worm wheel 7 is fitted onto the output shaft 3 so as to rotate together with the output shaft 3 coaxially and integrally. A resin engagement portion 7a of the worm wheel 7 engages with a worm 8b formed on an outer circumferential surface of an output shaft 8a of an electric motor 8. Accordingly, the rotation power of the electric motor 8 is designed to be transmitted to the output shaft 3 through the output shaft 8a, the worm 8b and the worm wheel 7. When the power and direction of rotation of the electric motor 8 are controlled suitably, optimum steering assisting torque can be given to the output shaft 3.

Figure 2:
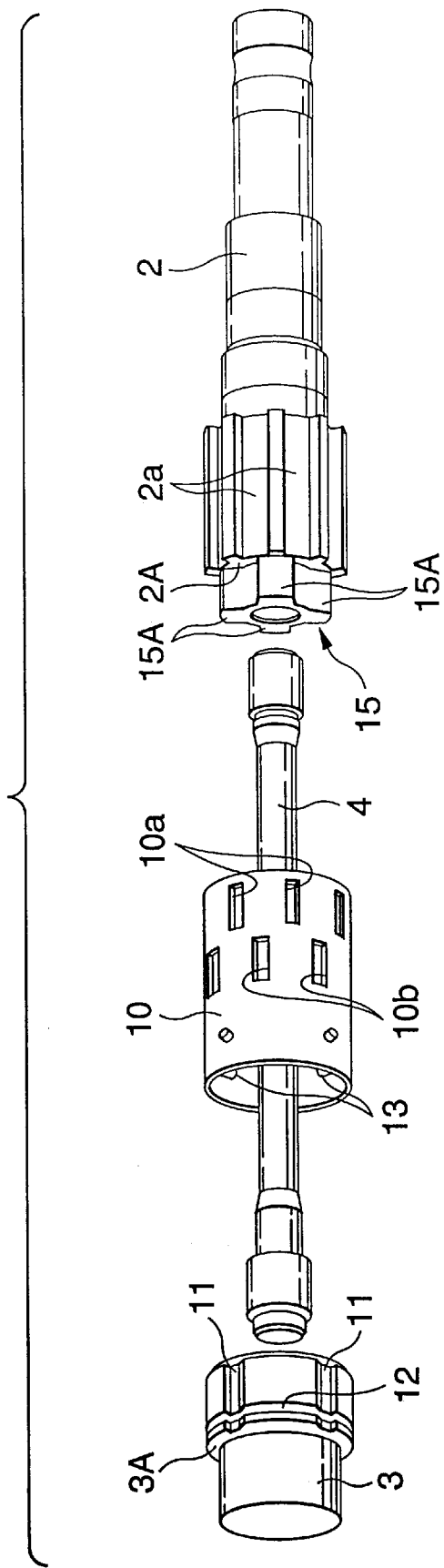
FIG. 2 is a perspective view of respective members which constitute a main part of the present invention.

Further, as shown in FIG. 1 and as shown in FIG. 2 which is a perspective view showing a state in which the torque sensor is exploded into parts such as the input shaft 2, the output shaft 3 (only an end portion) and the torsion bar 4, a large-diameter portion 2A is formed on the outer circumferential surface of the input shaft 2 in a portion near the output shaft 3 so as to be coaxial with the input shaft 2. A thin cylindrical member 10 is disposed near the outer circumferential surface of the large-diameter portion 2A so as to enclose the large-diameter portion 2A.

That is, the cylindrical member 10 is made from an electrically conductive non-magnetic material (for example, aluminum) and the lower end portion of the cylindrical member 10 is fixed on the outer circumferential surface of the input shaft 2 side end portion of the output shaft 3.

Figure 3:
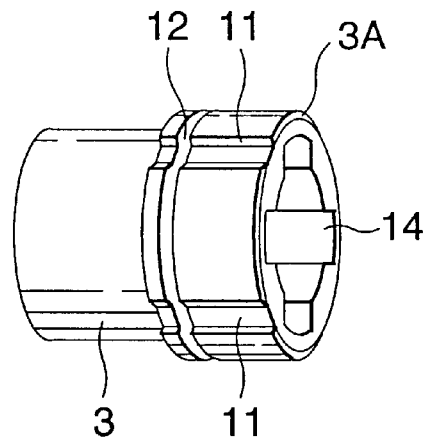
FIG. 3 is a perspective view of an end portion of the output shaft from a direction different from that in FIG. 2.
Figure 4A:
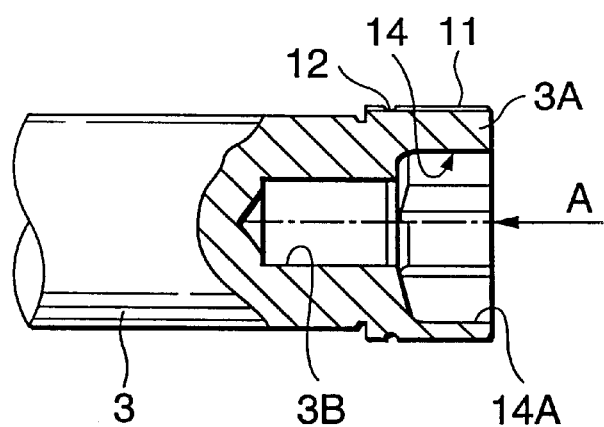
FIGS. 4A and 4B are views showing the configuration of the end portion of the output shaft.
Figure 4B:
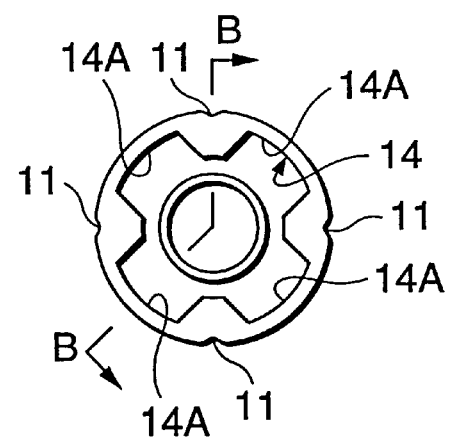

Specifically, as shown in FIG. 3 which is a perspective view of the end portion of the output shaft 3 from a direction different from that in FIG. 2, as shown in FIG. 4A which is a sectional view of the end portion of the output shaft 3 and as shown in FIG. 5 which is a sectional view showing a state in which the torsion bar 4 and the cylindrical member 10 are fixed, a large-diameter portion 3A is formed in the input shaft 2 side end portion of the output shaft 3. A plurality (four in this example) of axial grooves 11 extended axially and a circumferential groove 12 continued circumferentially are formed in the outer circumferential surface of the large-diameter portion 3A. Incidentally, FIG. 4B is a view from the direction A in FIG. 4A, so that FIG. 4A is equivalent to a sectional view taken along the line B—B in FIG. 4B. Further, FIG. 5A is equivalent to a sectional view taken along the line C—C in FIG. 5B.

Further, the respective axial grooves 11 are formed between opposite end portions of the large-diameter portion 3A so as to be disposed at circumferentially equal intervals of a distance (90 degrees). Further, the circumferential groove 12 is formed near a position where the end portion of the cylindrical member 10 is located when the cylindrical member 10 is fixed.

On the other hand, a plurality (four in this example) of semispherical protrusions 13 are formed on the inner circumferential surface of the cylindrical member 10 in positions which enter slightly deep from the lower end portion of the cylindrical member 10. The number and formation positions of these protrusions 13 correspond to those of the axial grooves 11 of the output shaft 3. Accordingly, the protrusions 13 are disposed circumferentially at equal intervals (90 degrees). Further, the height of the respective protrusions 13 is substantially equal to the depth of the respective axial grooves 11.

Further, in order to fix the cylindrical member 10 on the large-diameter portion 3A, the protrusions 13 are fitted into the respective axial grooves 11 to thereby perform circumferential positioning of the cylindrical member 10 relative to the output shaft 3. Then, the cylindrical member 10 is pushed so that the end portion of the cylindrical member 10 comes near the circumferential groove 12. In this condition, the end portion of the cylindrical member 10 is curved inward so as to engage into the circumferential groove 12. That is, the circumferential position of the cylindrical member 10 relative to the output shaft 3 is fixed by the fitting of the protrusions 13 into the respective axial grooves 11 and the axial position of the cylindrical member 10 relative to the output shaft 3 is fixed by the entering of the end portion into the circumferential groove 12.

Further, a spline hole 3B for spline-connection to the torsion bar 4 is formed coaxially in the input shaft 2 side end portion of the output shaft 3. Further, a female stopper 14 is formed on the end surface side inner circumferential surface of the spline hole 3B. As shown in detail in FIG. 4, the female stopper 14 is constituted by a cross-shaped hole having an inner circumferential surface which is recessed radially outward so as to form four concave portions 14A.

Further, a male stopper 15 is formed in an end portion of the input shaft 2 so as to correspond to the female stopper 14. As shown in detail in FIG. 2, the male stopper 15 is constituted by a cross-shaped shaft having an outer circumferential surface which is projected radially outward so as to form four convex portions 15A. The circumferential width of each of the convex portions 15A is slightly smaller than the circumferential width of each of the concave portions 14A. Accordingly, the rotation of the input shaft 2 relative to the output shaft 3 is limited within a predetermined angle range (of about ±5 degrees).

On the other hand, in a portion of the cylindrical member 10 which will enclose the large-diameter portion 2A after assembling, a plurality of rectangular windows 10a are formed at circumferentially equal intervals on a side far from the protrusions 13, and a plurality of rectangular windows 10b are formed at circumferentially equal intervals on a side near to the protrusions 13 so that the phases of the windows 10b, ..., 10b shift by 180 degrees from those of the windows 10a, ..., 10a.

On the contrary, a plurality of grooves 2a extended axially are formed at equal intervals in the large-diameter portion 2A of the input shaft 2. Incidentally, the number of the grooves 2a is equal to the number of the windows 10a and to the number of the windows 10b.

Further, the grooves 2a are located so that the phase difference between the widthwise center of each groove 2a and the widthwise center of a corresponding window 10a makes 90 degrees and so that the phase difference between the widthwise center of each groove 2a and the widthwise center of a corresponding window 10b makes 90 degrees reversely when no relative rotation between the input shaft 2 and the output shaft 3 is generated (when steering torque is zero).

That is, it is necessary to perform phase adjustment between the input shaft 2 and the cylindrical member 10 so that the grooves 2a overlap with the windows 10a and 10b in such a manner as described above when the input shaft 2, the output shaft 3, the torsion bar 4 and the cylindrical member 10 are assembled. Because the cylindrical member 10 is fixed to the output shaft 3 and the input shaft 2 and the output shaft 3 are connected to each other through the torsion bar 4, the phase relation between respective parts is determined as follows.

First, when steering torque is zero, the male stopper 15 formed on the input shaft 2 and the female stopper 14 formed in the output shaft 3 are combined with each other in a neutral position, that is, the convex portions 15A are located in the center portions of the concave portions 14A respectively. Therefore, the circumferential positions of the respective convex portions 15A of the male stopper 15 are used as a base of the phases of the respective portions of the input shaft 2 and the circumferential positions of the respective concave portions 14A of the female stopper 14 are used as a base of the phases of the respective portions of the output shaft 3.

With respect to the input shaft 2, therefore, the circumferential positions of the grooves 2a, ..., 2a formed in the large-diameter portion 2A are determined on the basis of the convex portions 15A.

On the other hand, with respect to the output shaft 3, the circumferential positions of the axial grooves 11, ..., 11 formed in the outer circumferential surface of the large-diameter portion 3A are determined on the basis of the concave portions 14A.

Further, with respect to the cylindrical member 10, the circumferential positions of the windows 10a, ..., 10a and 10b, 10b are determined on the basis of the protrusions 13.

If the circumferential positions of respective portions are determined in the aforementioned manner, the phase relations of the grooves 2a, ..., 2a with the windows 10a, ..., 10a and with the windows 10b, ..., 10b are set as described above by neutral setting of the stoppers even in the case where the phase adjustment of the cylindrical member 10 is not performed specifically at the time of assembling.

Further, in order to obtain the aforementioned phase relations securely, accuracy of finishing of respective portions is very important. Therefore, in this embodiment of the invention, as for the input shaft 12, the grooves 2a and the male stopper 15 are formed integrally with the input shaft 2 by means of cold forging, and as for the output shaft 3, the grooves 11 are formed integrally with the output shaft 3 by means of cold forging.

Referring back to FIG. 1, a coil unit 16 having coils 20A and 20B of the same standard is fixed to the inside of the upper housing 1A so as to enclose the cylindrical member 10.

Figure 6:
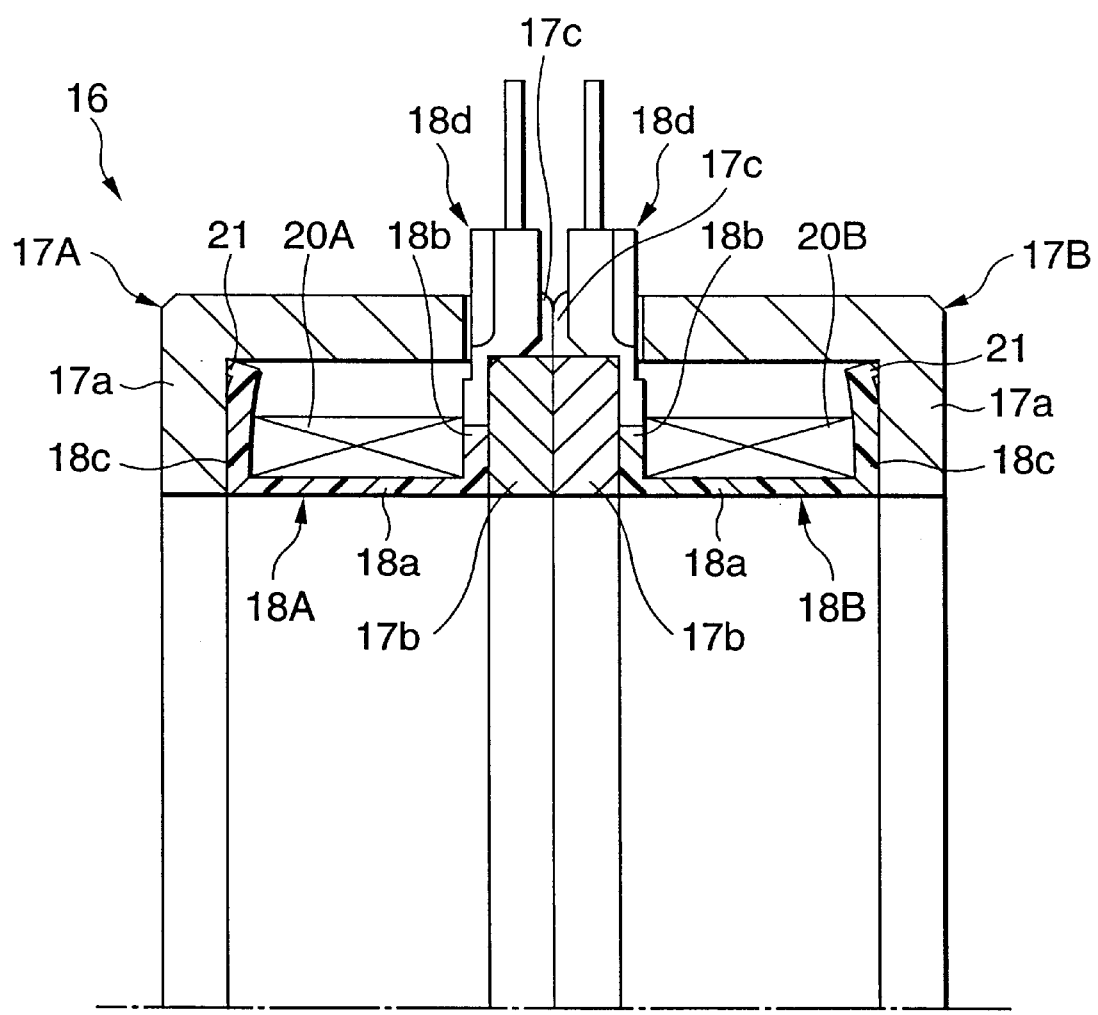
FIG. 6 is a sectional view showing the configuration of the coil unit as another main part of the present invention.

That is, as shown in FIG. 6 which is a sectional view of the coil unit 16 (only one side with respect to the center axis is shown, and the left/right direction in FIG. 6 is the axial direction), the coil unit 16 includes two coil yokes 17A and 17B, and two coil bobbins 18A and 18B received in the coil yokes 17A and 17B respectively.

Each of the coil yokes 17A and 17B is constituted by a ring-like member which is made of iron and U-shaped in section opened in the radially inner side. Each of the coil yokes 17A and 17B is constituted by a yoke member 17a L-shaped in section which forms the side surface and one bottom surface of the above U-shaped section and a yoke member 17b press-fitted into an axial end portion of the yoke member 17a so as to form the other bottom surface of the above U-shaped section.

Figure 7:
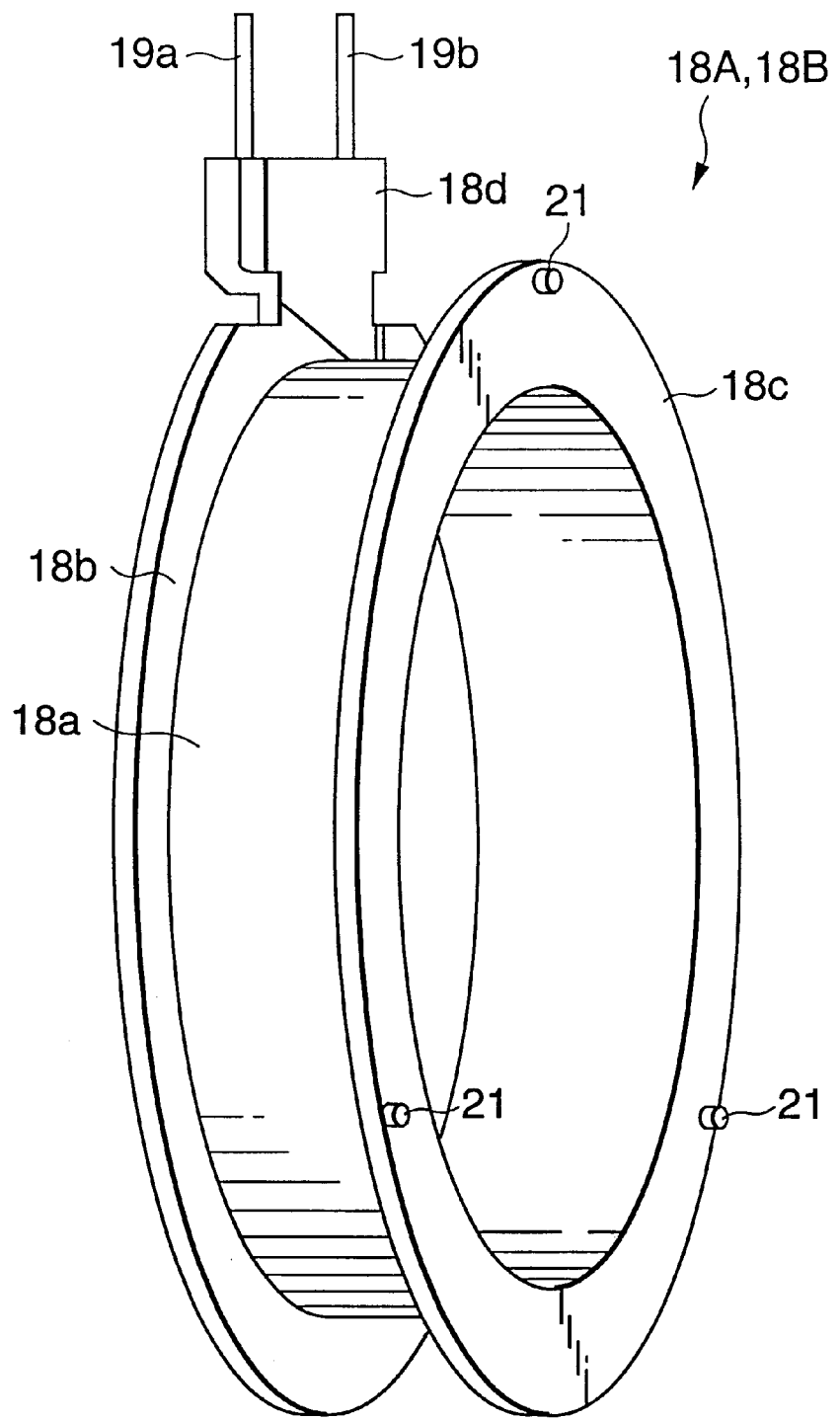
FIG. 7 is a perspective view of the coil bobbin.

On the other hand, each of the coil bobbins 18A and 18B is constituted by a member which is U-shaped in section opened in the radially outer side and which is made of a synthetic resin reinforced by fiber such as glass fiber, carbon fiber, or the like. As shown in FIG. 7, which is a perspective view of one coil bobbin, flange portions 18b and 18c are provided on opposite end portions of a cylindrical portion 18a so that the coil 20A (20B) is wound on a portion surrounded by the cylindrical portion 18a and the flange portions 18b and 18c. Incidentally, the coils 20A and 20B are coaxial with the cylindrical member 10. One coil 20A encloses a portion of the cylindrical member 10 in which the windows 10a, ..., 10a are formed, while the other coil 20B encloses a portion of the cylindrical member 10 in which the windows 10b, ..., 10b are formed.

Incidentally, the axial size of each of the coil bobbins 18A and 18B, that is, the distance between the two flange portions 18b and 18c is formed so as to be substantially equal to the distance between the two bottom surfaces of each of the coil yokes 17A and 17B, that is, the distance between the inner surface of the bottom surface formed by the yoke member 17a and the inner surface of the bottom surface formed by the yoke member 17b.

Further, a terminal mount portion 18d substantially shaped like a rectangular parallelepiped is formed in a circumferential position of one flange portion 18b in each of the coil bobbins 18A and 18B. Two metal pins 19a and 19b are fixed to the upper surface of the terminal mount portion 18d so as to protrude radially outward. One end portion of the coil 20A (20B) is wound on a base portion of one of the pins 19a and 19b. The other end portion of the coil 20A (20B) is wound on a base portion of the other of the pins 19a and 19b. Accordingly, configuration is made so that a voltage can be externally applied between the opposite end portions of each of the coils 20A and 20B. Incidentally, a notch 17c for leading the terminal mount portion 18d out of each of the coil yokes 17A and 17B is formed in the yoke member 17a in each of the coil yokes 17A and 17B.

Further, on the circumferential edge portion of an axially outer surface of the other flange portion 18c in each of the coil bobbins 18A and 18B, a plurality (three in this example) of columnar protrusions 21 are formed integrally with the flange portion 18c at circumferentially equal intervals.

Further, the respective pins 19a and 19b are connected to the substrate 22 received in the sensor casing 21 formed in the upper housing 1A. A motor control circuit not shown is formed on the substrate 22. The specific configuration of the motor control circuit will be not described in detail because it departs from the gist of the present invention. For example, as disclosed in Japanese Patent Publication No. Hei. 8-240491, the motor control circuit may comprise: an oscillating portion for supplying an alternating current of a predetermined frequency to the coils 20A and 20B; a first rectifying and smoothing circuit for rectifying and smoothing the self-induced electromotive force of the coil 20A to output it; a second rectifying and smoothing circuit for rectifying and smoothing the self-induced electromotive force of the coil 20B to output it; a differential amplifier for amplifying the output difference between the first and second rectifying and smoothing circuits; a noise eliminating filter for eliminating high-frequency noise from the output of the differential amplifier; a torque arithmetic operation portion for making an arithmetic operation to obtain the direction and size of the rotational displacement of the input shaft 2 relative to the cylindrical member 10 on the basis of the output of the noise eliminating filter and multiplying the result of the arithmetic operation, for example, by a predetermined proportional constant to obtain steering torque generated in a steering system; and a motor drive portion for supplying a drive current to the electric motor 8 so that steering assisting torque for reducing steering torque is generated on the basis of the result of the arithmetic operation made by the torque arithmetic operation portion.

The operation of this embodiment will be described below.

Assuming now that the steering system is in a straight moving state in which steering torque is zero, then no relative rotation between the input shaft 2 and the output shaft 3 is generated. Accordingly, no relative rotation between the input shaft 2 and the cylindrical member 10 is generated.

On the contrary, when the steering wheel is operated to generate rotating force in the input shaft 2, the rotating force is transmitted to the output shaft 3 through the torsion bar 4. In this occasion, resisting force corresponding to frictional force between the transmission wheel and the road surface or corresponding to frictional force on engagement, or the like, of gears in the rack-and-pinion steering apparatus is generated in the output shaft 3. Accordingly, relative rotation is generated between the input shaft 2 and the output shaft 3 by twisting of the torsion bar 4 so that the output shaft 3 is delayed. Relative rotation is also generated between the input shaft 2 and the cylindrical member 10. The direction and quantity of the relative rotation are determined in accordance with both the direction of the operation of the steering wheel and the steering torque generated.

When relative rotation is generated between the input shaft 2 and the cylindrical member 10, the state of overlapping of the grooves 2a with the windows 10a, . . . , 10a and with the windows 10b, . . . ,10b changes from the initial state. Furthermore, because the phase relations between the windows 10a, . . . , 10a and the windows 10b, . . . , 10b are set as described above, the state of overlapping of the grooves 2a with the windows 10a, . . . , 10a and the state of overlapping of the grooves 2a with the windows 10b, . . . , 10b change in directions reverse to each other.

As a result, the self inductance of the coil 20A and the self inductance of the coil 20B change in directions reverse to each other in accordance with the relative rotation between the input shaft 2 and the cylindrical member 10. Accordingly, the self-induced electromotive forces of the coils 20A and 20B change in directions reverse to each other. Accordingly, when the difference between the self-induced electromotive forces of the coils 20A and 20B is measured, the difference changes linearly in accordance with the direction and size of the steering torque. On the other hand, the change of self inductance caused by the temperature, or the like, is canceled in the differential amplifier contained in the motor control circuit.

Further, the torque arithmetic operation portion in the motor control circuit obtains steering torque on the basis of the output of the differential amplifier. Further, the motor drive portion supplies the electric motor 8 with a drive current in accordance with the direction and size of the steering torque. Then, rotating force is generated in the electric motor in accordance with the direction and size of the steering torque generated in the steering system. The rotating force is transmitted to the output shaft 3 through both the worm 8b and the worm wheel 7. As a result, steering assisting torque is given to the output shaft 3. Accordingly, the steering torque is reduced, so that the burden imposed on the driver is lightened.

Further, in this embodiment, a plurality of axial grooves 11 and a circumferential groove 12 are formed in an end portion of the output shaft 3 so that not only the protrusions 13 of the cylindrical member 10 are fitted into the axial grooves 11 respectively but also the end portion of the cylindrical member 10 is curved so as to engage into the circumferential groove 12. Accordingly, even in the case where members different in material, such as the output shaft 3 of iron and the cylindrical member 10 of aluminum, are used, reduction of holding power caused by difference between the thermal expansion coefficients, or the like, of the members is prevented. Accordingly, the probability that the circumferential and axial positions of the cylindrical member 10 relative to the output shaft 3 may be displaced from the initial positions and that the displacement may be contained in the torque detection value can be reduced greatly. Accordingly, this embodiment is very suitable for a torque sensor used in an electric power steering apparatus which requires high reliability in terms of safety.

Further, in this embodiment, not only the grooves 2a and the male stopper 15 are formed integrally with the input shaft 2 by means of cold forging but also the axial grooves 11 are formed integrally with the output shaft 3 by means of cold forging. Accordingly, the phase adjustment at the time of assembling can be performed easily. There is an advantage that this fact can contribute to reduction in production cost.

Here, in this embodiment, the input shaft 2 is equivalent to the second rotation shaft and the output shaft 3 is equivalent to the first rotation shaft.

Incidentally, the end portion of the cylindrical member 10 is curved so as to engage into the circumferential groove 12 in this embodiment. However, the length of the cylindrical member 10 or the position of the circumferential groove 12 is changed, and a groove engaging portion can be formed on the inner circumferential surface of the cylindrical member 10 at an arbitrary portion of the cylindrical member 10 in the axial direction thereof. That is, a portion of the cylindrical member 10, which is disposed outward of the circumferential groove 12 is engaged into the circumferential groove 12 thereby prevent an axial displacement of the cylindrical member relative to the first rotation shaft.

Next, the assembling of the coil unit 16 will be described below.

That is, after the coil bobbins 18A and 18B having the coils 20A and 20B wound thereon respectively are positioned so that the terminal mount portions 18d are received in the notches 17c respectively, the coil bobbins 18A and 18B are pushed into the inside of the yoke members 17a respectively and the yoke members 17b are press-fitted into the end portions of the yoke members 17a respectively. Then, as shown in FIG. 6, the coil yokes 17A and 17B containing the coil bobbins 18A and 18B respectively are fitted into the upper housing 1A while the coil yokes 17A and 17B are made to abut on each other so that the terminal mount portions 18d face each other.

Then, when the coil bobbins 18A and 18B are received in the coil yokes 17A and 17B respectively, the protrusions 21 formed on the coil bobbins 18A and 18B abut on the yoke members 17a so that the circumferential edge portions of the flange portions 18c of the coil bobbins 18A and 18B having elasticity are bent inward as shown in detail also in FIG. 6 because the axial sizes of the coil bobbins 18A and 18B are selected in such a manner as described above. As a result, the protrusions 21 press the yoke members 17a axially by the elastic restoring force of the bent flange portions 18c. However, because the axial movements of the coil bobbins 18A and 18B are prevented by the yoke members 17b fitted to the yoke members 17a respectively, the axial positions of the coil bobbins 18A and 18B are limited by the aforementioned pressing force.

Accordingly, also when the coil unit 16 is fixed into the upper housing 1A and the substrate 22 is arranged, the pins 19a and 19b can be inserted into predetermined positions on the substrate 22 substantially securely without the positional displacement of the pins 19a and 19b if the substrate 22 is arranged in a predetermined position.

Further, after the pins 19a and 19b are inserted in the substrate 22, the top end portions of the pins 19a and 19b are fixed to the substrate 22 by means of welding. However, if the axial movements of the coil bobbins 18A and 18B are prevented in such a manner as described above, unnecessary load can be prevented from being imposed on the aforementioned welded/fixed portions even in use. Accordingly, this can contribute to the improvement of the reliability on an electric circuit containing the welded/fixed portions. That is, a high-reliable torque sensor can be provided.

Further, because the protrusions 21 are formed on the circumferential edge portions of the flange portions 18c, the flange portions 18c can be bent relatively easily. Because the bending of the flange portions 18c acts mainly on the radially outside portions, the influence on the coils 20A and 20B becomes slight.

Here, in this embodiment, the input shaft 2, the output shaft 3, the torsion bar 4, the grooves 2a and the cylindrical member 10 constitute an impedance change means and the protrusions 21 constitute a pressure means.

Further, the configuration of the coil bobbins 18A and 18B is not limited to the aforementioned embodiment. For example, as shown in FIGS. 8A and 8B, three or more (eight in this example) semispherical protrusions 21 may be circumferentially provided.

Figure 9A:
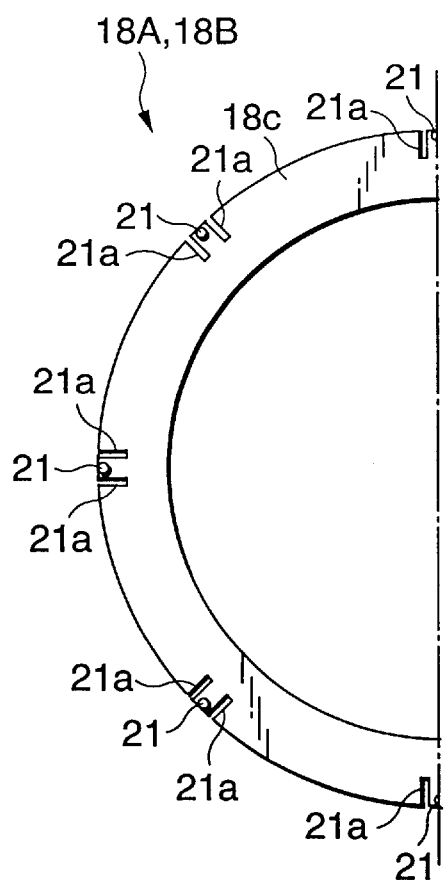
FIGS. 9A, 9B and 9C are views showing a further embodiment of the coil unit.
Figure 9B:
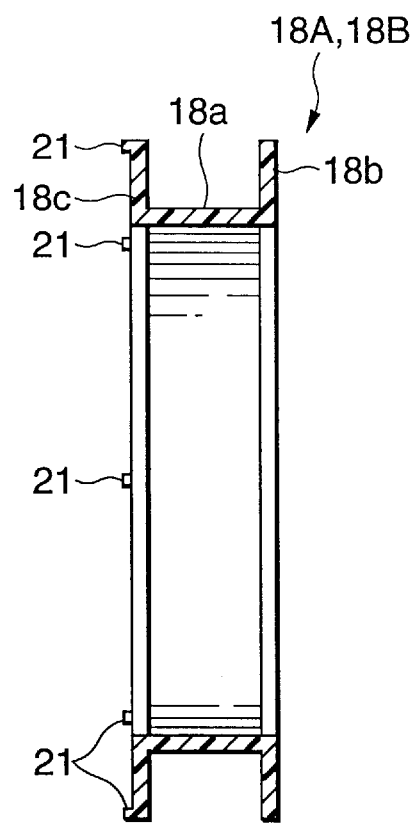
Figure 9C:
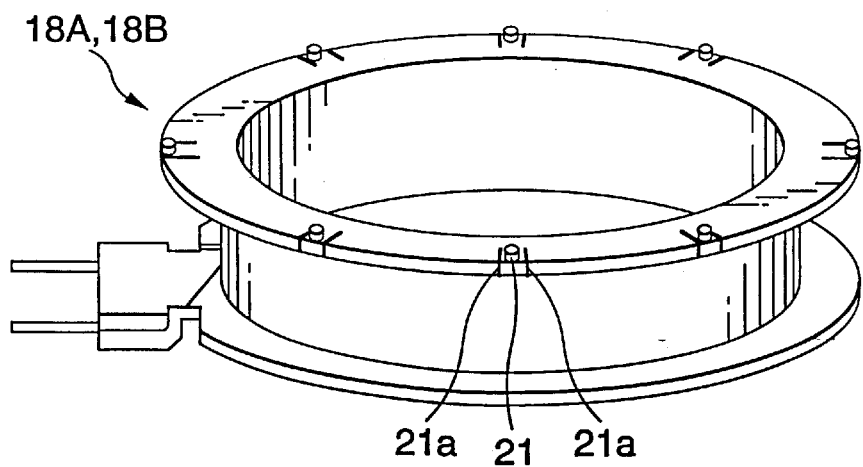

Alternatively, as shown in FIGS. 9A to 9C, notches 21a led to the outer circumferential portion of the flange portion 18c may be formed in positions where the protrusions 21 are put between left and right notches. That is, if the notches 21a are formed, the portions in which the protrusions 21 are formed serve as leaf springs. Accordingly, the operation of pressing the yoke member 17a axially can be fulfilled more remarkably. Furthermore, because the portions to be bent are limited to the aforementioned portions serving as leaf springs, the influence on the portions where the coils 20A and 20B are wound can be made substantially zero.

Figure 10A:
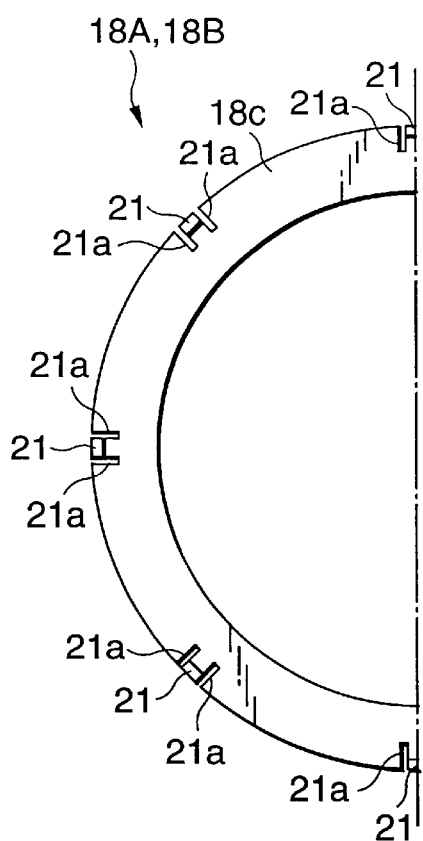
FIGS. 10A, 10B and 10C are views showing a still further embodiment of the coil unit.
Figure 10B:
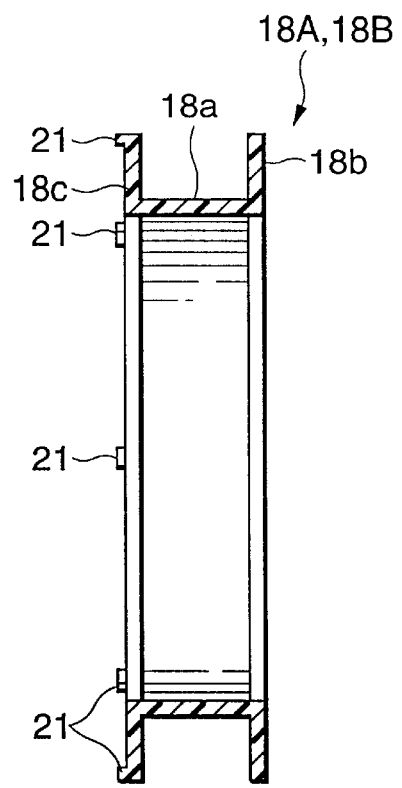
Figure 10C:
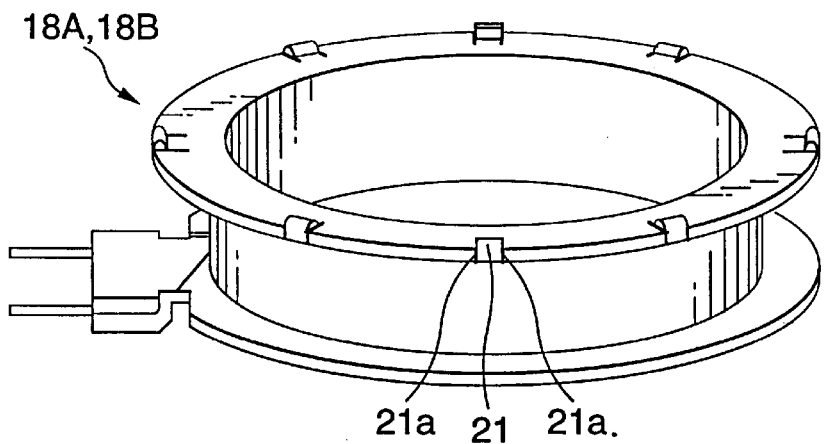

Further, the shape of the protrusions 21 may be provided, for example, semicylindrically as shown in FIGS. 10A to 10C or other shapes may be used.

Although the aforementioned embodiment has been described above upon the case where two coil bobbins 18A and 18B are provided as separate members, the present invention is not limited thereto but may be applied to the case where, for example, a coil bobbin having two grooves where two coils 20A and 20B are to be wound is employed so that yoke members are fitted to the coil bobbin from the outside.

Although the aforementioned embodiment has been described above upon the case where protrusions 21 as pressing means are provided on the coil bobbins 18A and 18B, the present invention is not limited thereto but may be applied to the case where, for example, such protrusions are formed on the yoke member 17a or formed both on the coil bobbins 18A and 18B and on the yoke members 17a as occasion demands. However, the formation on the coil bobbins 18A and 18B of synthetic resin has an advantage in cost from the point of view of easiness in finishing, etc.

Although the aforementioned embodiment has been described above upon the case where a torque sensor according to the present invention is applied to an electric power steering apparatus for vehicle, it is a matter of course that the present invention is not limited thereto but may be applied to torque sensors used for other purposes.

As described above, according to the present invention, a plurality of axial grooves extended axially and a circumferential groove continued circumferentially are formed in an outer circumferential surface of an end portion of a first rotation shaft on a side in which a cylindrical member is fixed; a plurality of protrusions are formed on an inner circumferential surface of the cylindrical member so as to be fitted into the plurality of axial grooves respectively; the protrusions are fitted into the axial grooves respectively to thereby prevent the rotation of the cylindrical member; and a portion of the cylindrical member which is to be fitted onto the circumferential groove is caulked to thereby prevent the axial displacement of the cylindrical member. Accordingly, the probability that the circumferential and axial positions of the cylindrical member may be displaced relative to the first rotation shaft can be reduced. There is an effect that a high-reliable torque sensor can be provided.

As described above, according to the present invention, at least one of the coil bobbin and the coil yoke is provided with a pressure means for pressing the other of the coil bobbin and the coil yoke axially when the coil bobbin is received in the coil yoke. Accordingly, there is an effect that not only labor at the time of assembling is simplified but also reliability after assembling is improved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A torque sensor comprising:

a torsion bar;

a first rotation shaft;

a second rotation shaft disposed coaxially and connected to said first rotation shaft through said torsion bar;

a cylindrical member fixed to an end portion of said first rotation shaft so as to enclose at least a part of said second rotation shaft to thereby detect torque based on an overlapping state of said cylindrical member with said second rotation shaft;

a plurality of axial grooves being formed on an outer circumferential surface of the end portion of said first rotation shaft to which said cylindrical member is fixed so as to be extended in an axial direction of said first rotation shaft;

a circumferential groove continuously and circumferentially formed on the outer circumferential surface of the end portion of said first rotation shaft; and a plurality of protrusions being formed on an inner circumferential surface of said cylindrical member to be fitted into said plurality of axial grooves respectively, wherein said protrusions are fitted into said axial grooves respectively to thereby prevent a rotation of said cylindrical member relative to said first rotation shaft, and a portion of said cylindrical member which is to be fitted into said circumferential groove is deformed to fit into said circumferential groove to thereby prevent an axial displacement of said cylindrical member relative to said first rotation shaft.

2. A torque sensor according to claim 1, wherein an end portion of said cylindrical member is curved inward and engaged into said circumferential groove.

3. A torque sensor according to claim 1, wherein said first rotation shaft has a female stopper formed at an end surface thereof, said female stopper comprising a hole having a concave portion projected radially outward in a cross section of said first rotation shaft, and said second rotation shaft has a male stopper formed at an end surface thereof, said male stopper comprising a convex portion projected radially outward in a cross section of said second rotation shaft so as to correspond to said concave portion.

4. A torque sensor according to claim 3, wherein said female stopper and said axial grooves are formed integrally with said first rotation shaft by cold forging, and said male stopper is formed integrally with said second rotation shaft by cold forging.

5. A torque sensor comprising:

a housing;

a rotation shaft supported to said housing so as to be rotatable;

a coil unit having a coil disposed so as to enclose said rotation shaft; and an impedance change means for changing impedance of said coil in accordance with change of torque acting on said rotation shaft, in which torque generated in said rotation shaft is detected based on a voltage between terminals of said coil, wherein said coil unit comprises:

a coil bobbin having said coil wound thereon; and a coil yoke for receiving said coil bobbin, said coil yoke comprising a ring-like member having a U-shape section which is radially opened in an inner side so that said coil bobbin is received therein between opposite bottom surfaces of the U-shape section; and pressure means provided in at least one of said coil bobbin and said coil yoke for axially pressing an other one of said coil bobbin and said coil yoke when said coil bobbin is received in said coil yoke.

6. A torque sensor according to claim 5, wherein said pressure means comprises a plurality of protrusions provided on a circumferential edge portion of said coil bobbin.

7. A torque sensor according to claim 6, wherein said coil bobbin has a plurality of notches formed on both sides of said protrusions and being led to an outer circumferential edge of said coil bobbin.

8. A torque sensor according to claim 6, wherein said protrusion has a columnar shape.

9. A torque sensor according to claim 6, wherein said protrusion has a semispherical shape.

10. A torque sensor according to claim 6, wherein said protrusion has a semicylindrical shape.

* * * * *